United States Patent
Calvert

[11] 3,710,468
[45] Jan. 16, 1973

[54] CUTTING TOOLS

[76] Inventor: Roger Calvert, 13 Hyperion Road, Germiston, Transvaal, South Africa

[22] Filed: Oct. 12, 1971

[21] Appl. No.: 188,074

[30]  Foreign Application Priority Data

Oct. 15, 1970  South Africa .......................70/7024

[52] U.S. Cl. ...................................................29/96
[51] Int. Cl. ..............................................B26d 1/00
[58] Field of Search ........................................29/96

[56]  References Cited

UNITED STATES PATENTS 3,341,922  9/1967  Gustafson ...............................29/96
3,309,757  3/1967  Konwal ...................................29/96
3,084,416  4/1963  Broughton ..............................29/96

*Primary Examiner*—Leonidas Vlachos
*Attorney*—Richard K. Stevens et al.

[57]  ABSTRACT

A cutting tool comprising a stock having a recessed end shaped to receive a cutting insert in the recess, a rotatable pin extending into a transverse hole in the stock adjacent the recess and having a head at its end adjacent the recess, a stop at the other end of the pin adapted to prevent withdrawal thereof from the hole, said head having an underside located in a plane inclined to the axis of the pin, the pin being such that upon rotation thereof an insert located in the recess is clamped therein.

10 Claims, 4 Drawing Figures

PATENTED JAN 16 1973　　　　　　　　　　　　　3,710,468

CUTTING TOOLS

This invention relates to cutting tools bearing detachable and discardable cutting inserts and more particularly to means to clamping the insert.

According to this invention there is provided a cutting tool comprising a stock having a recessed end forming a seat for an insert, said insert being adapted to be clamped against the faces of the recess by the head of a rotatable pin fitted through a hole transverse to the stock, the pin having a stop at the lower end thereof to engage with the stock and to limit its axial movement, and the head having the underside forming a plane inclined to the axis of the pin, the arrangement being such that the lower end of the pin head is adapted to engage the upper face of the insert.

Further features of the invention provide for the axis of the pin to be inclined to the axis of the stock, for the head of the pin to have a formation enabling the pin to be turned by means of a complementary tool, for the stop to be a circlip engaging in a groove at the lower end of the pin, or for the stop to be a screw having the diameter of the head greater than the diameter of the hole in the stock and fitting into a tapped lower end of the pin.

A preferred embodiment of the invention will be described below by way of example only, reference being made to the accompanying drawings in which.

Figure 1:
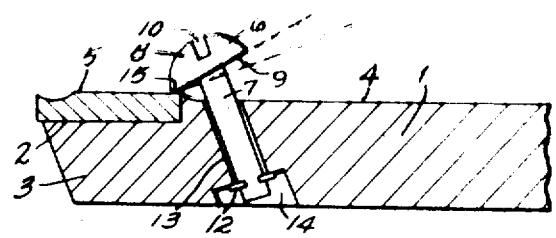
FIG. 1 is a cross-sectional side elevation of a cutting tool having a clamp engaging the insert.

In this embodiment of the invention a cutting tool includes a stock 1 having a recess 2 located at one end 3 of the upper face 4 thereof. The recess 2 is adapted to receive a cutting insert 5 which may be discardable and/or indexable.

The insert 5 is retained in the recess 2 by means of a clamp 6 which comprises a pin 7 having a head 8 at the upper end.

Figure 2:
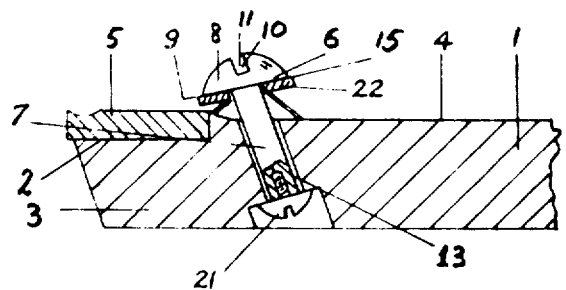
FIG. 2 is a cross-sectional side elevation of a cutting tool with the clamp in the disengaged position.
Figure 3:
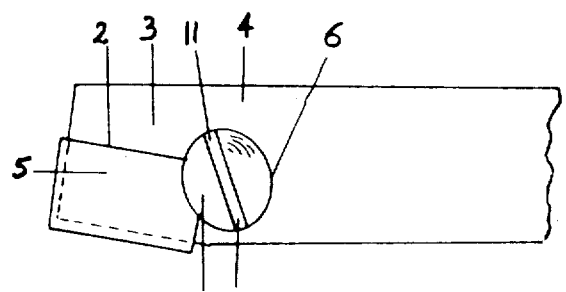
FIG. 3 is a plan view of the cutting tool having the clamp engaging the insert.

The underside 9 of the head is formed by a flat surface inclined at the axis of the pin 7 whereas the upper side thereof has formations 10 enabling the pin to be turned by engaging a tool with said formations. These may be a slot 11 adapted for use with a screw driver as shown in FIG. 1, 2 and 3 or a socket for an Allen key, as in FIG. 4.

The lower end of the pin has a peripheral groove adapted to receive a circlip 12 to form a stop.

The pin 7 fits into a hole 13 inclined to the axis of the stock 1 and located adjacent to the recess 2, such that the head 8 of the pin 7 engages the insert 5. The circlip 12 is applied on the groove at the lower end of the pin 7 to retain the latter in the hole 13 and to limit its axial movement.

It is preferable for the lower end of the pin 7 having the circlip 12 to be within the stock 1. A recess 14 is thus formed at the lower end of the hole such that the pin 7 will not project from the lower face of the stock.

It will be understood that because of the inclined underside 9 of the head 8, rotation of the pin 7 will engage the lower edge 15 of the head 8 to the insert 5. Further rotation or reversed rotation will disengage the head from the insert 5 and the latter may thus be removed, replaced or indexed.

The choice of the materials for the component parts is optional. In one form the stock was made of steel of the type known in Britain as EN 9 or as SAE4142 or SAE 4140 in the United States of America, whereas the pin was made of chrome molybdenum.

Figure 4:
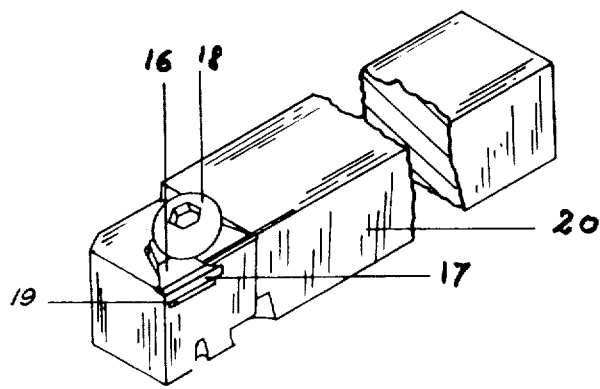
FIG. 4 is an isometric view of an alternate form of a cutting tool.

Alternate forms of the invention include a screw 21 forming the stop in which the screw has the diameter of the head thereof greater than the diameter of the hole 13 and is fitted into a tapped lower end of the pin 7 as shown in FIG. 2. This form allows for a variable pin length and consequently for different thicknesses of the insert. A cotter pin or the like located at the lower end and through a transverse hole in the pin may also be used as a stop. The pin 7 need not be inclined but may be at right angles to the longitudinal axis of the stock. Further, the insert may include a chip breaker 16 mounted between the cutting bit 17 and the head 18 of the pin and/or a supporting plate 19 between the cutting bit 17 and the stock 20 as shown in FIG. 4.

Optional accessories include a wearing washer 22 located between the pin head 8 and the stock 1, as shown in FIG. 2, and a spring to bias the pin head 8 away from the stock 1 and insert 5. The spring may take the form of a spring washer. Also the wearing washer may be resilient and shaped to act both as a wearing washer and spring.

It will be appreciated that with the above-described clamping arrangement, the insert may be easily and quickly replaced. Also, the invention is not limited to the tools in the example described but may be used on right or left hand knife tools (shown in FIG. 4), facing tools, boring tools, milling cutters, roller box tools and tipped end mills, for example.

What I claim as new and desire to secure by Letters Patent is:

1. A cutting tool comprising a stock having a recessed end shaped to receive a cutting insert in the recess, a rotatable pin extending into a transverse hole in the stock adjacent the recess and having a head at its end adjacent the recess, a stop at the other end of the pin adapted to prevent withdrawal thereof from the hole, said head having an underside located in a plane inclined to the axis of the pin, the pin being such that upon rotation thereof an insert located in the recess is clamped therein.

2. A cutting tool as claimed in claim 1 in which the axis of the pin is inclined to the axis of the stock.

3. A cutting tool as claimed in claim 1 in which the head of the pin has a formation enabling it to be turned by means of a tool.

4. A cutting tool as claimed in claim 1 in which the stop is a circlip engaging a groove adjacent the end of the pin opposite the head.

5. A cutting tool as claimed in claim 1 in which the stop is a screw having a head of greater diameter than the hole in the stock and fitting into a tapped hole in the end of the pin opposite the head.

6. A cutting tool as claimed in claim 1 in which the stop engages a depression in the surface of the stock opposite the recess.

7. A cutting tool as claimed in claim 1 in which the recess is shaped to receive an insert including a chip breaker.

8. A cutting tool as claimed in claim 1 in which the recess is shaped to receive an insert including a supporting plate.

9. A cutting tool as claimed in claim 1 in which a wearing washer is located between the pin head and the stock.

10. A cutting tool as claimed in claim 1 in which the pin head is biased away from the stock by means of a spring.

* * * * *